No. 732,251. PATENTED JUNE 30, 1903.
G. F. APPLEGATE.
PENDENT LENS EYEGLASSES.
APPLICATION FILED MAR. 15, 1900.

NO MODEL.

WITNESSES:
E. L. Fullerton.
Clifton C. Hallowell

INVENTOR:
GEORGE F. APPLEGATE,
by Arthur E. Paige
Atty.

No. 732,251.

Patented June 30, 1903.

UNITED STATES PATENT OFFICE.

GEORGE F. APPLEGATE, OF TRENTON, NEW JERSEY.

PENDENT-LENS EYEGLASSES.

SPECIFICATION forming part of Letters Patent No. 732,251, dated June 30, 1903.

Application filed March 15, 1900. Serial No. 8,722. (No model.)

*To all whom it may concern:*

Be it known that I, GEORGE F. APPLEGATE, of Trenton, in the State of New Jersey, have invented certain new and useful Improvements in Pendent-Lens Eyeglasses, whereof the following is a specification, reference being had to the accompanying drawings.

My invention relates to that class of eyeglasses adapted solely for reading and similar near-vision use as distinguished from both the so-called "bifocal" and "distant lens" eyeglasses.

The ordinary construction and arrangement of eyeglasses of the class to which my invention relates are such that the lenses are upheld by the frame with the axes of the lenses coincident with the normal line of sight of the user, and therefore when the user desires to view distant objects the eyeglasses must be entirely removed or the head of the user must be downwardly inclined to afford a partial field of sight above the lenses.

It is the object of my invention to provide eyeglasses comprising lenses arranged in such relation to their supporting-frame members as to be constantly maintained below the eyes of the user, and thus afford a clear field of vision of distant objects at the normal line of sight above the lenses, at the same time presenting said lenses in proper position to be used for reading or similar purposes requiring the downcast vision of the user.

Figure 1:
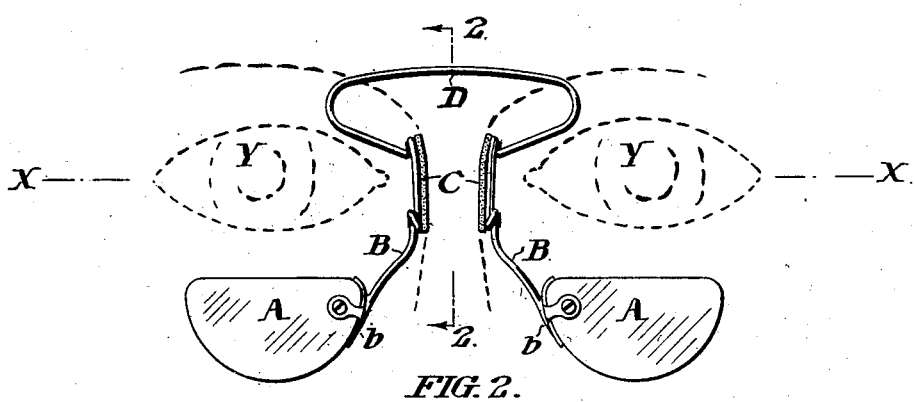
Figure 2:
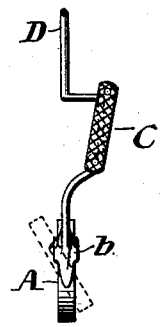
Figures 3, 4:
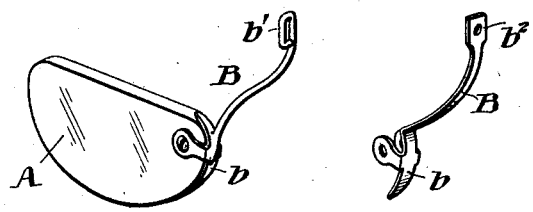

In the accompanying drawings, Figure 1 is a front elevation of a convenient embodiment of my invention, showing the relation of the same with respect to the eyes and normal line of sight of the user. Fig. 2 is a sectional view taken on the line 2 2 of Fig. 1. Figs. 3 and 4 show modifications of details of construction.

Referring to Fig. 1, the line X X indicates the normal line of sight of the user, and the lenses A are shown to be maintained so far below the user's eyes (indicated at Y) that a clear field of vision is afforded above said lenses without movement of the user's head. The lenses A are pendent upon the arms B, which extend below the nose-guards C, and said guards C are maintained in the ordinary relation to the features of the user by means of the spring-bridge D.

In the form of my invention shown in Figs. 1 and 2 the bridge D and arms B are in unitary relation, being formed of a single length of wire bent as indicated and having lens-clamps $b$ brazed at its extremities. Such construction is adapted for convenient adjustment in every direction necessary for the optician to fit the user. However, as shown in Fig. 3, the arm B may terminate in a bight $b'$, adapted to be secured with respect to the ordinary bridge and nose-guard by means of the ordinary screw, and Fig. 4 shows a further modification of my invention, wherein the arm B is formed in integral relation with the clamp $b$ from a single stamping of sheet metal, adapted for securement with respect to the bridge and nose-guard by means of the aperture $b^2$ at its upper extremity.

It is to be noted that the various forms of the arms B which I have shown may be bent to vary the pupillary distance of the lenses in accordance with the requirements of the user, and I find it desirable in some instances to so bend said arms as to fix the lenses in the position shown in dotted lines in Fig. 2, so that the plane thereof shall be substantially normal to the line of vision when the eyes are downcast, as is usual in the act of reading.

I am aware that it is not unusual for the user of eyeglasses to shift the same to the extremity of the nose, and thus lower the lenses with respect to the normal line of sight for the purpose described. It is to be noted, however, that I do not claim such disposition of the lenses merely with respect to the features of the user, but I do claim the specified arrangement of the lenses with respect to the frame connecting them, by which the bridge and nose-guards may be engaged in the ordinary and preferable position with respect to the nose, but with the lenses pendent below the position in which they are maintained in ordinary eyeglasses.

I do not desire to limit myself to the precise details of construction which I have illustrated, as it is obvious that various modifications may be made therein without departing from the spirit of my invention.

I claim—

1. An eyeglass-frame consisting of a bridge, nose-guards and the pendent curved arms B, attached at their upper ends to said guards and having means at their lower ends for the attachment of lenses, substantially as set forth.

2. An eyeglass comprising a bridge-piece, nose-guards and the pendent curved arms B, attached at their upper ends to said guards, and lenses attached to the lower ends of said arms and lying in a plane forming an acute angle with the plane of said bridge-piece and nose-guards, substantially as set forth.

3. In an eyeglass, the combination with a bridge D, and pendent curved arms B in integral relation; of nose-guards C, fixed upon said frame between said bridge D, and arms B; lens-clamps $b$, upon the free lower extremities of said arms B; and lenses attached to said clamps and lying in a plane forming an acute angle to the plane of said bridge-piece and nose-guards, substantially as set forth.

GEORGE F. APPLEGATE.

Witnesses:
 FREEMAN C. LEAMING,
 JACOB STIEF.